(12) United States Patent
Horrell

(10) Patent No.: US 6,412,210 B1
(45) Date of Patent: Jul. 2, 2002

(54) ANIMATED DUCK DECOY

(76) Inventor: Charles W. Horrell, 1407 Branchwood St., Jonesboro, AR (US) 72404

( * ) Notice: Subject to any disclaimer, the term of this patent is extended or adjusted under 35 U.S.C. 154(b) by 0 days.

(21) Appl. No.: 09/772,997

(22) Filed: Jan. 31, 2001

(51) Int. Cl.$^7$ .............................................. A01M 31/06
(52) U.S. Cl. .............................. 43/3; 446/155; 446/156
(58) Field of Search ................... 43/2, 3; 446/153–156, 446/158, 160–164; 119/702, 707, 708

(56) References Cited

U.S. PATENT DOCUMENTS

| | | | |
|---|---|---|---|
| 2,434,335 A | | 1/1948 | Signalness |
| 2,457,295 A | | 12/1948 | Woodhead |
| 2,460,128 A | | 1/1949 | Greenleaf |
| 2,691,233 A | * | 10/1954 | Richardson ...................... 43/3 |
| 2,835,064 A | | 5/1958 | Webb |
| 2,849,823 A | * | 9/1958 | Miller ............................... 43/3 |
| 3,434,234 A | * | 3/1969 | Watts ........................... 446/153 |
| 3,916,553 A | | 11/1975 | Lynch et al. |
| 3,927,485 A | | 12/1975 | Thorsnes, Jr. |
| 4,056,890 A | | 11/1977 | Dembski |
| 4,322,908 A | | 4/1982 | NcCrory |
| 4,535,560 A | * | 8/1985 | O'Neil ............................. 43/3 |
| 4,612,722 A | | 9/1986 | Ferrell |
| 5,367,813 A | * | 11/1994 | Cherry ............................. 43/2 |
| 5,377,439 A | | 1/1995 | Roos et al. |
| 6,079,140 A | | 6/2000 | Brock, IV |

FOREIGN PATENT DOCUMENTS

| | | |
|---|---|---|
| CA | 1050268 | 3/1979 |
| GB | 1454523 | 11/1976 |
| GB | 383031 | 11/1982 |

* cited by examiner

*Primary Examiner*—Thomas Price
*Assistant Examiner*—Susan Piascik

(57) ABSTRACT

An animated duck decoy having a mechanism employing a driver gear having gear teeth disposed on half its periphery, the other half being without teeth, which engages a driven gear mounted on the same axle with a grooved wheel to wind and unwind a cord attached to an anchor in order to produce repetitive movement of the decoy. The animated duck decoy may be disposed to simulate a diving duck by attaching the cord to an anchor which can be placed on the bottom of a body of water. The animated duck decoy also may be disposed to simulate one duck chasing another duck by tethering it to a tree and attaching the cord to a conventional duck decoy which is tethered to a second tree by an elastic cord.

18 Claims, 6 Drawing Sheets

ANIMATED DUCK DECOY

BACKGROUND OF THE INVENTION

1. Field of the Invention

The present invention relates generally to bird decoys. More specifically, the invention is an animated duck decoy. In one embodiment the duck decoy simulates a diving duck, while in another embodiment the duck decoy simulates a chasing movement, both embodiments using the same drive mechanism.

2. Description of the Related Art

The related art of interest describes various moving bird decoys, but none discloses the present invention. There is a need for a versatile animated duck operating on a battery energized mechanism with a unique gear system which can simulate a diving duck. Further, the animated decoy can be combined with a normal decoy to simulate one duck chasing another duck. The related art will be discussed in the order of perceived relevance to the present invention.

U.S. Pat. No. 2,457,295, issued on Dec. 28, 1948 to John A. Woodhead, describes a duck decoy having a hinged head tied to a string under the bill and passing through an eyelet on the body to a sheave mechanism anchored on the bottom of the water to the hunter on the shore. The hunter pulls the string to pull the head down to simulate a feeding movement. The hinged head has a limiting snub line on the back of the neck. Each webbed foot has a spring mechanism for movement when the decoy is tipped. The duck decoy is distinguishable for its hinged head and feet with spring action, and manual as opposed to motorized actuation.

U.S. Pat. No. 3,927,485, issued on Dec. 23, 1975 to John Thorsnes, Jr., describes a waterfowl decoy having a pivoting neck tied by a lanyard to the bill and passing through a bottom anchored swivel pulley to the operator. The decoy is distinguishable for its pivoting neck structure, and by manual operation.

U.S. Pat. No. 2,835,064, issued on May 20, 1958 to James E. Webb, describes a motorized decoy with a swinging head, a quacking sound maker, and a propeller for movement across the water. An intricate assortment of bevel gears, ratchet wheels, and a sounding box with a reed are energized by a battery. The decoy is distinguishable for its random movement in the water and the requirement for a quacking noise maker.

U.S. Pat. No. 2,434,335, issued on Jan. 13, 1948 to Alfred M. Signalness, describes a duck decoy staked on a bottom, wherein the duck has a head pivoting with a counterweight when pulled by a cord from a blind. The stake has a bell crank arm pivoting on the stake and limited by a coil spring. The bell crank arm is connected to the decoy by a vertical rod. The decoy is distinguishable for requiring the anchor stake and bell crank arm, and by manual operation of the bell crank arm.

U.S. Pat. No. 2,460,128, issued on Jan. 25, 1949 to Carroll V. Greenleaf, describes an animated decoy duck comprising a rocking head having a bore containing a bead of mercury which actuates a mechanism to drive a propeller. A crank plate linked to a pair of ratchet toothed pawl plates, a ratchet wheel, and gears rotate the propeller. The decoy is anchored by a line to a lead drag. The decoy is distinguishable for requiring the rocking head and propeller means.

U.S. Pat. No. 3,916,553, issued on Nov. 4, 1975 to Howard M. Lynch et al., describes a wild fowl decoy for placement on land with a stake. The head has a pecking action caused by a battery-powered motor adapted to operate a cam having a cam follower inside the body. The decoy is distinguishable for its mechanized pecking motion and stationary position.

U.S. Pat. No. 4,056,890, issued on Nov. 8, 1977 to Gary R. Dembski, describes a tethered duck decoy having a coil spring wound by an external key providing power for playing a phonograph recording of a duck call through a speaker. The decoy shell includes a pawl and ratchet arrangement operable to wind and unwind a tether line connected to an anchor and an expansion spring which causes bobbing. The decoy is distinguishable for its required phonograph player, speaker and spring action of the anchor.

U.S. Pat. No. 4,322,908, issued on Apr. 6, 1982 to Roy E. McCrory, describes an animated wildfowl decoy having a self-contained power and control system energized by either solar energy or rechargeable battery power. A capstan type torque conversion system provides movement back and forth on a horizontal tether string, automatic direction reversal and sporadic movements of the decoy. A double-pole, double-throw slide switch is provided under the bill. The decoy is distinguishable for its requirement for solar power, a capstan torque conversion system, a direction switch, and a timer.

U.S. Pat. No. 4,612,722, issued on Sep. 23, 1986 to Mike C. Ferrell, describes a random movement, motorized waterfowl decoy comprising a duck decoy having a battery-driven propeller and a keel-rudder attached by a tether line to an anchor. The decoy is distinguishable for the omission of sprocket gearing.

U.S. Pat. No. 5,377,439, issued on Jan. 3, 1995 to Richard J. Roos et al., describes a remotely controlled duck decoy having a receiver unit responsive to commands from a transmitter. A battery driven propeller by a reversible motor, servo mechanisms, a remotely controlled rudder, a remotely controlled lower jaw for gathering downed ducks, a remotely controlled tow hook on the decoy's tail for towing other decoys, and a remotely controlled anchor dropped from below the bill are provided elements. The decoy is distinguishable for its multitudinous remotely controlled elements.

U.S. Pat. No. 6,079,140, issued on Jun. 27, 2000 to Robert C. Brock, IV, describes a motion system for decoys comprising a plurality of decoys attached by lines to a submerged frame containing a motor driven propeller under remote control. When the motor is activated, the frame sinks and activates the decoys. The apparatus is distinguishable for requiring a submerged motion activator element.

Canada Patent Application No. 1,050,268, published on Mar. 13, 1979, describes an anchored waterfowl decoy comprising movable wings controlled by strings from a duck blind. The decoy is distinguishable for being restricted to remotely controlled flapping wings.

U.K. Patent Application No. 383,031, published on Nov. 10, 1932, describes a motorized bird decoy comprising a feathered bird having feathered wings actuated by an electric motor to spread and contract the wings. The wings are attached to curved metal strips connected by levers with a wheel driven by the motor.

None of the above inventions and patents, taken either singularly or in combination, is seen to describe the instant invention as claimed. Thus, a diving duck decoy with a unique gearing system used alone or with another conventional decoy is desired.

SUMMARY OF THE INVENTION

The present invention is directed to an animated duck decoy. The decoy has an internal drive mechanism which has a rechargeable battery driven motor driving a first axle having a driver gear lacking gear teeth on half of its perimeter mounted thereon. The driver gear with the toothed portion engages a driven gear mounted on a second axle on which is also mounted a grooved wheel to which a cord is attached. The cord passes out through the chest of the decoy. The upper half of the decoy is hinged for access and lockable to the bottom half. An on/off switch and a battery recharger element are provided on the outside of the decoy.

In a first embodiment the cord is attached to an anchored weight and the decoy dives as the driver gear's teeth engage the driven gear, the cord winding about the grooved wheel. However, when the smooth portion of the driver gear is in apposition to the driven gear, the cord unwinds allowing the decoy to return to its normal floating position until the next cycle. This periodic diving motion of the decoy attracts other waterfowl.

In a second embodiment, the novel decoy is attached behind a conventional decoy, and both decoys are attached in tandem between a pair of tree trunks on a body of water. A bungee cord is attached in the line between the first tree and the conventional decoy. The animated decoy pulls on the conventional decoy as the gear teeth engage and the cord is wound on the grooved wheel. When the smooth portion of the perimeter of the driver gear is in apposition to the gear teeth of the driven gear, the pull on the forward decoy is released, and the bungee cord contracts. The decoys return to their original tandem position resulting in the apparent chasing of one decoy after another decoy. The resulting repetitive chasing action of the decoys attract other waterfowl.

Accordingly, it is a principal object of the invention to provide an animated duck decoy capable of repetitive motion.

It is another object of the invention to provide an animated decoy displaying a periodic diving motion.

It is a further object of the invention to provide an animated duck decoy having an internal gear mechanism with a driver gear having teeth about only half of the gear's perimeter.

Still another object of the invention is to provide an animated duck decoy capable of being used with a conventional decoy to create the effect of one duck chasing another.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
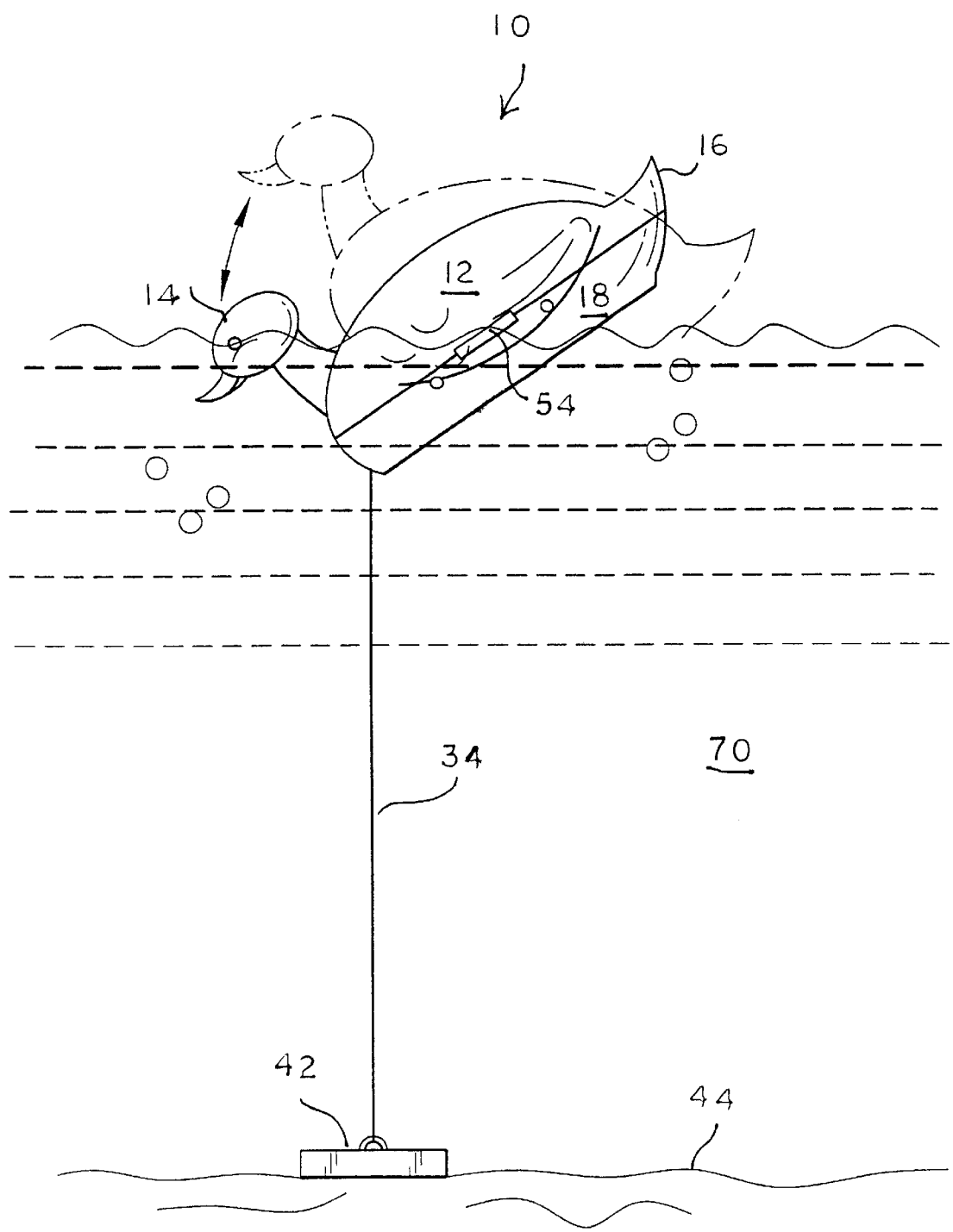
FIG. 1 is an environmental, elevational view of a first embodiment of animated duck decoy according to the present invention configured to simulate a diving duck.

The present invention is directed to an animated duck decoy 10 configured as a diving duck decoy in the first embodiment, illustrated in FIG. 1. A hollow duck decoy body is shown having a top half 12, including a head 14 and a tail 16, and a bottom half 18 having a smooth body. The decoy 10 can be molded plastic with the conventional coloring of the body parts.

Figure 4:
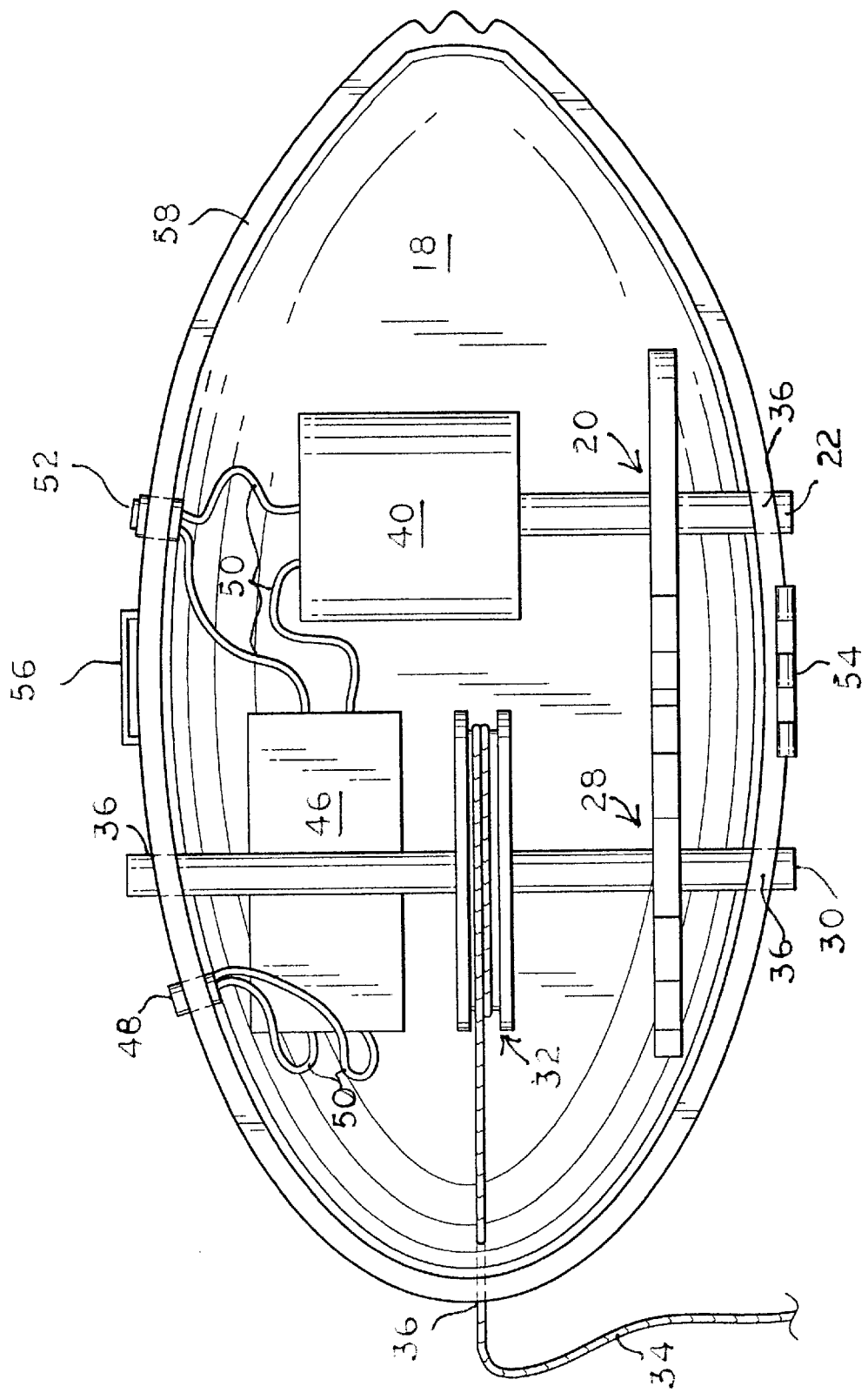
FIG. 4 is top plan view of the animated duck decoy with the top half removed.
Figure 6:
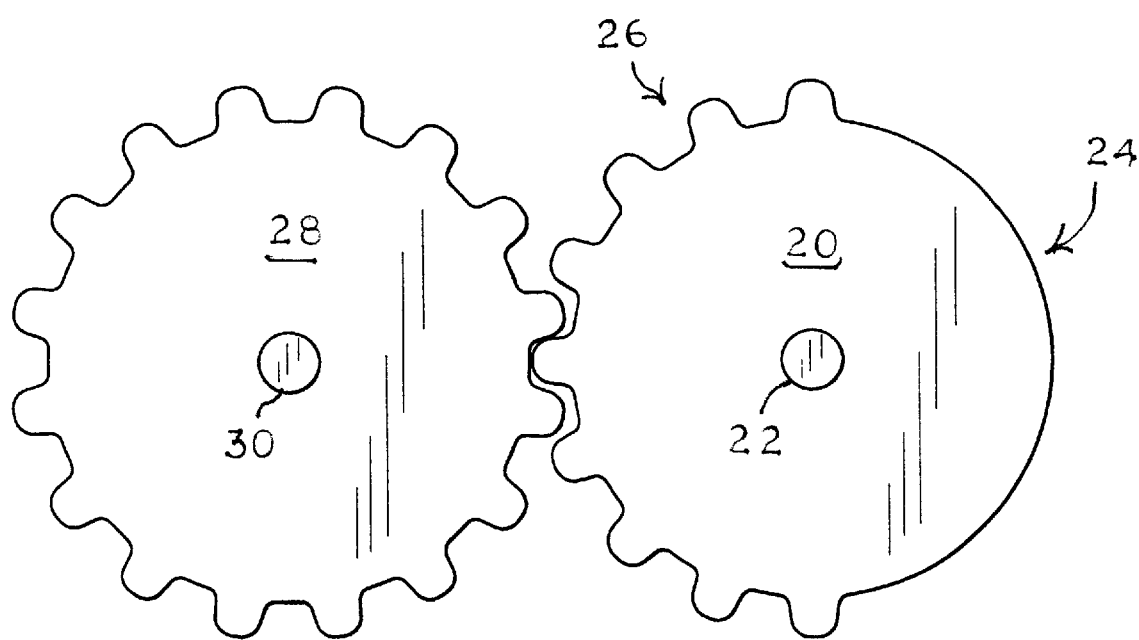
FIG. 6 is a side elevational view of the engaged gears.

The internal mechanical parts, shown in FIG. 4, are disposed in the bottom half 18 of the decoy 10 and include driver gear 20 mounted on a first axle 22 having half of its periphery smooth at 24, and the remaining half having gear teeth at 26 (FIG. 6). A driven gear 28 mounted on a second axle 30 is positioned to mesh with the gear teeth portion 26 of the driver gear 20.

As shown in FIG. 4, a grooved wheel 32 is also fixedly attached to the second axle 30. A nylon cord 34, such as twenty pound fishing line, is attached to the grooved wheel 32 and configured to wind and unwind due to the alternate meshing and non-meshing of the driver and driven gears, 20, 28, respectively. The second axle 30 projects from the bottom half 18 of the body at both ends through apertures 36 having a waterproof sealing means such as a grommet (not shown) functioning as braking means when the second axle 30 is free-wheeling. Similarly, the first axle 22 is supported on one end by a grommet (not shown) in aperture 36. Alternatively, the second axle 30 and the free end of the first axle 22 may be rotatably mounted in bearings attached to the inner surface of the walls of the bottom half 18 of the decoy 10. The second axle 30 may have annular flanges (not shown) at opposite ends adjacent the side apertures 36 in order to prevent the second axle 30 from sliding laterally, which might disengage the driven gear 28 from the driver gear 20. A rotating means, a D.C. motor 40, is attached on the opposite end of the first axle 22 and to the bottom of the body to rotate the driver gear 20 at a constant speed. The first axle 22 may be the shaft of the motor 40, or may be attached to the shaft of the motor 40.

FIG. 4 depicts the cord 34 passing out through a centered aperture 36 having a waterproof grommet (not shown) positioned in the bottom half 18 of the body for passing the cord 34 out of the body proximate the top of the bottom half 18 below the decoy's bill and thence to an anchor 42 (such as a lead scuba diver's weight, concrete block, brick, etc.) on the bottom 44 of a body of water. The anchor 42 should be of adequate weight to pull down the diving duck decoy 10 without movement along the bottom 44. The duck decoy 10 may further include a guide means, such as a guide pulley (not shown), for ensuring that the cord 34 does not slip out of the groove on the grooved wheel 32.

As shown further in FIG. 4, a rechargeable battery 46 drives the D.C. motor 40. The rechargeable battery 46 may be recharged via a recharger connection 48 positioned in the wall of the bottom half 18 of the body, or it may simply be removed from the bottom half 18 and placed in a charging unit. The electrical lines 50 connect the recharger connection 48, the rechargeable battery 46, the D.C. motor 40, and an on/off switch 52 located on the outside surface of the bottom half 18 of the decoy 10.

Figure 5:
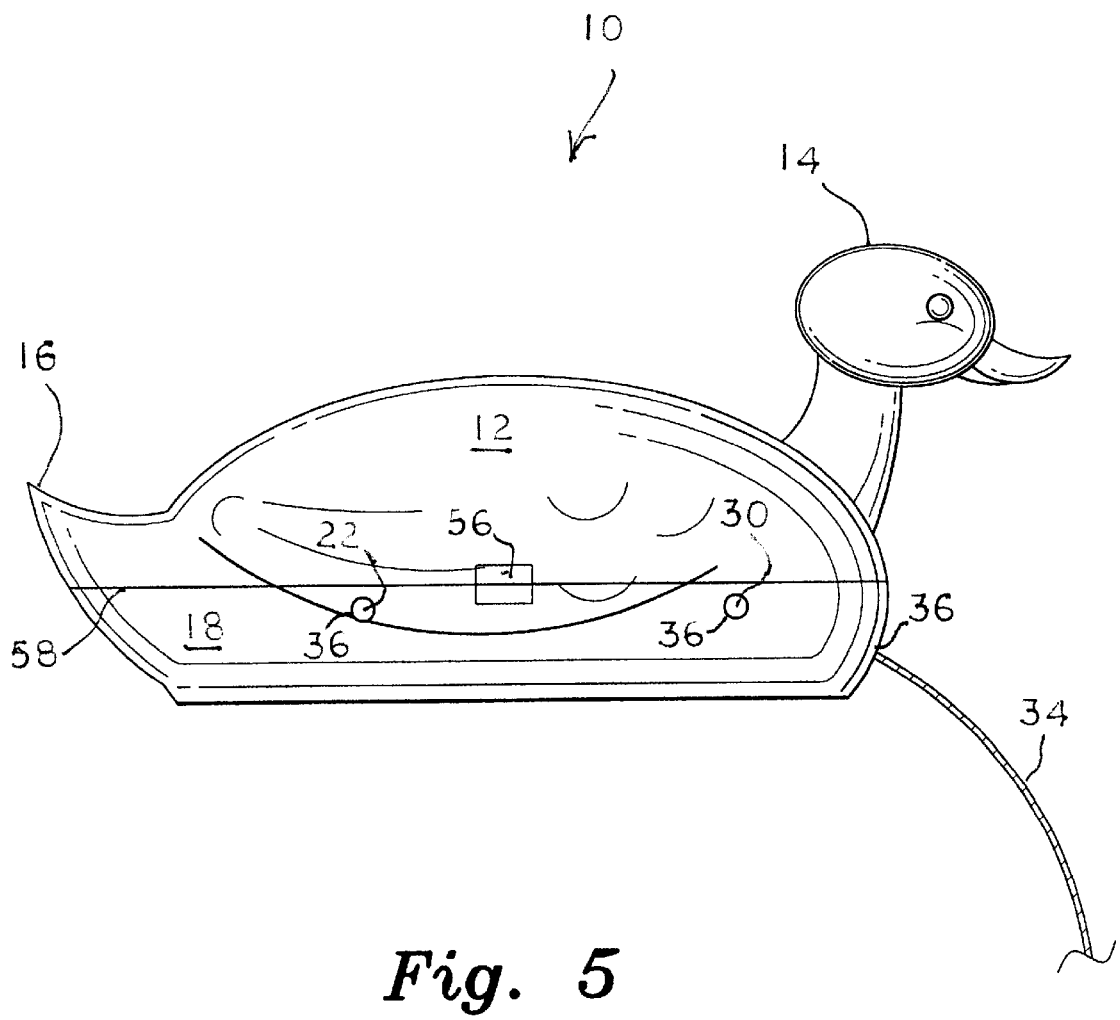
FIG. 5 is a left side elevational view of the decoy.

A hinge 54 illustrated in FIGS. 1 and 4 is provided for joining the top half 12 of the body to the bottom half 18. A lock 56, either lockable by a key or spring-latched, is provided to secure the top half 12 of the body to the bottom half 18 as shown in FIGS. 4 and 5. The top and bottom halves of the body have waterproof sealing means such as a flexible gasket 58 as shown in FIG. 4.

The decoy 10 is caused to dive as the driver and driven gears 20, 28, respectively, engage and the cord 34 winds on the grooved wheel 32, and the decoy 10 is caused to return to its normal floating position when the gears 20, 28 do not engage. When the gears 20, 28 do not engage, the anchor 42 causes the cord 34 to rapidly unwind from the grooved wheel 32, and the buoyancy of the decoy 10 causes the decoy 10 to suddenly pop to the surface of the water, much the same way a live duck pops up while feeding. The waterproof grommets (not shown) on the second axle 30 act as a resilient brake when the second sprocket wheel 28 is free-wheeling. Bushings can optionally be added as an effective brake. Once the decoy 10 is actuated by turning the switch 52 to the on position, the cycle is continuously repeated, with the decoy 10 diving and bobbing to the surface once for every revolution of the motor's shaft 22.

Figure 2:
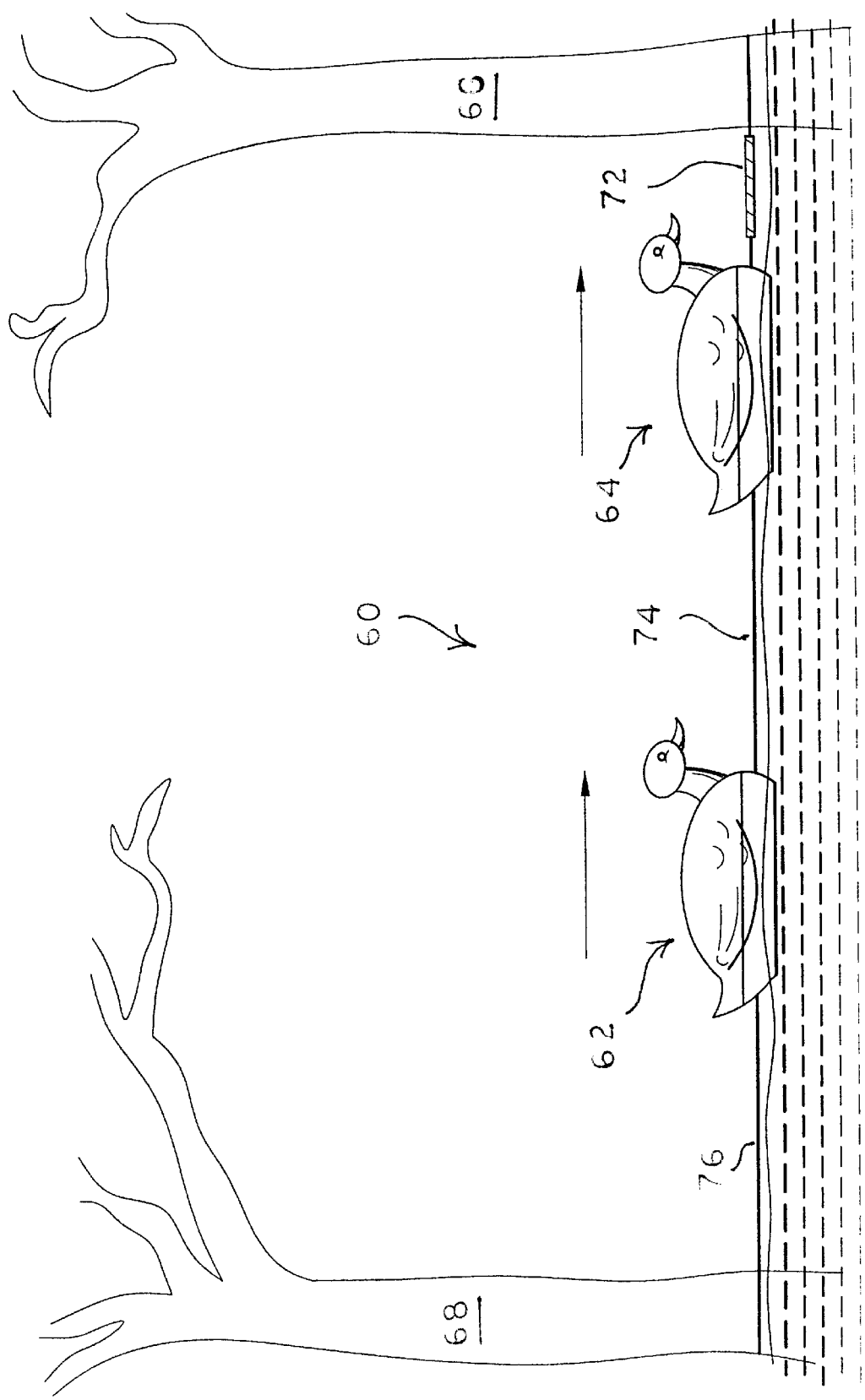
FIG. 2 is an environmental, elevational view of a second embodiment of an animated duck decoy according to the present invention configured to simulate one duck chasing another.
Figure 3:
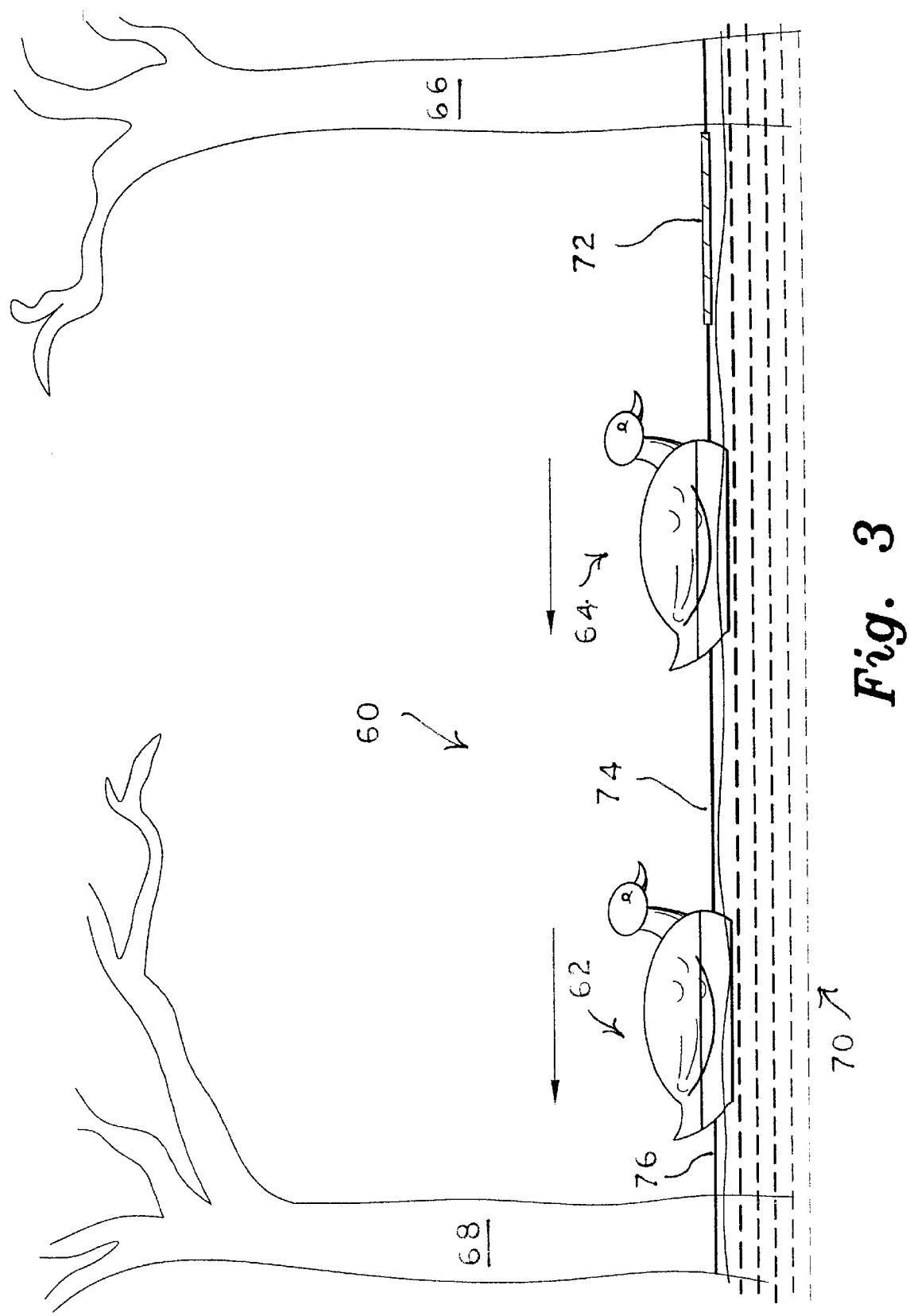
FIG. 3 is a side elevational view of the FIG. 2 embodiment, wherein the bungee cord is stretched by the animated decoy.

In a second embodiment depicted in FIGS. 2 and 3, a decoy system 60 of two decoys consisting of an animated duck decoy 62 (having the same internal construction as animated duck decoy 10) and a conventional inanimate duck decoy 64 are fastened in tandem between two trees 66, 68 on body of water 70 such as a pond, marsh, swamp land, etc. Optionally, stakes can be substituted for trees in open water. The conventional duck decoy 64 is fastened to the first tree 66 with a bungee cord 72 or other elastic tether. The diving duck decoy 62 is attached to the conventional decoy 64 by a retractable cord 74 (the same as cord 34) and attached to the second tree 68 by a second non-retractable cord 76.

As depicted in FIG. 3, when the animated duck decoy 62 is actuated by turning on the motor 40, the decoy 62 pulls on the first conventional decoy 64 as the driver and driven gears, 20, 28, respectively, engage. The retractable cord 74 is wound up in the animated decoy 62, drawing the conventional decoy 64 towards it, which causes the bungee cord 72 to stretch. The decoy 64 is caused to return to its normal position during the half cycle when the gears 20, 28, respectively, do not engage and the bungee cord 72 contracts, simulating one duck chasing a second duck. This action is repeated until the switch 52 is turned off or the battery runs down.

It will be seen that in both embodiments the internal construction of the animated duck decoy 10 and 62 is the same, the only difference being the different bias means attached to the cord 34 or 74 for unwinding the cord 34 or 74 from the grooved wheel 32. In both cases, the drive mechanism or gear train causes a repetitive movement (diving in the first embodiment, translational movement simulating a chase in the second embodiment) which recurs once for every revolution of the motor's shaft 22.

It is to be understood that the present invention is not limited to the embodiments described above, but encompasses any and all embodiments within the scope of the following claims.

I claim:

1. An animated duck decoy, comprising:
   a buoyant hollow body simulating the appearance of a duck, the body having a top half including a head and a tail, and having a bottom half, the hollow body having at least one aperture defined therein;
   a first axle and a second rotatable axle disposed in the bottom half of said hollow body;
   a driver gear having half of its periphery smooth and the remaining half having gear teeth, the driver gear being mounted on said first axle;
   a driven gear mounted on said second axle disposed to mesh with the gear teeth portion of said driver gear;
   a grooved wheel mounted on said second axle;
   an inelastic cord attached to the grooved wheel and disposed to wind and unwind on said grooved wheel, the cord having a free end passing through the at least one aperture defined in said hollow body; and
   a rotating means attached on one end of the first axle for rotating said driver gear;
   a bias means for applying tension to said cord in order to unwind said cord from said grooved wheel;
   whereby the animated duck decoy engages in repetitive motion during each revolution of said driver gear, the teeth of said driver gear meshing with said driven gear during one-half of each revolution to wind said cord on said grooved wheel, and unmeshing during the other one-half revolution to unwind said cord.

2. The animated duck decoy according to claim 1, wherein said bias means comprises an anchor tied to said cord, whereby the animated duck decoy repetitively simulates a diving duck when said anchor is placed at the bottom of a body of water.

3. The animated duck decoy according to claim 1, wherein the rotating means is a D.C. motor.

4. The animated duck decoy according to claim 3, further comprising a rechargeable battery electrically connected to said D.C. motor.

5. The animated duck decoy according to claim 4, further comprising a recharger connection positioned in an outside wall of the bottom half of the body and electrically connected to the rechargeable battery.

6. The animated duck decoy according to claim 1, further comprising an on/off switch positioned in the bottom half for controlling the rotating means.

7. The animated duck decoy according to claim 1, further comprising a hinge joining the top half of the body to the bottom half.

8. The animated duck decoy according to claim 1, further comprising a lock attached to the body for securing the top half of the body to the bottom half.

9. The animated duck decoy according to claim 1, further comprising waterproof sealing means disposed between the top and bottom halves of the body.

10. The animated duck decoy according to claim 1, further comprising a tether attached to said hollow body adapted for tethering the animated duck decoy to a first immovable support, and wherein said bias means comprises:
    an inanimate duck decoy attached to said cord; and
    an elastic member attached to said inanimate duck decoy, the elastic member being adapted for attachment to a second immovable support;
    whereby the animated duck decoy simulates a first duck chasing a second duck, said inelastic cord winding on said grooved wheel to pull the inanimate duck decoy in a first direction when the driver gear engages the driven gear, and unwinding when the driver gear disengages from the driven gear, said bias means pulling the inanimate duck decoy in a direction opposite to the first direction, the winding and unwinding being repeated with each revolution of said driver gear.

11. A decoy system of two decoys for fastening between two immovable supports over a body of water, the decoy system comprising:

a conventional duck decoy;

a bungee cord attached to said conventional duck decoy, said bungee cord being attachable to a first immovable support;

an animated duck decoy;

a first cord attached to said animated duck decoy, the first cord being attachable to a second immovable support;

said animated duck decoy comprising;

a buoyant hollow body simulating a duck's appearance and having a top half including a head and tail, and having a bottom half, the body having at least one aperture defined therein;

a first axle and a second rotatable axle disposed in the bottom half;

a driver gear having half of its periphery smooth and the remaining half having gear teeth, the drive gear being mounted on said first axle;

a driven gear mounted on said second axle meshing with the gear teeth of the driver gear;

a grooved wheel mounted on the second axle;

an inelastic cord attached to the grooved wheel and disposed to wind and unwind on said grooved wheel, the cord having a free end passing through the at least one aperture defined in said hollow body, the free end being attached to said conventional duck decoy; and a rotating means attached on one end of the first axle to rotate the driver gear;

wherein the animated duck decoy is caused to pull said conventional duck decoy towards it when the driver gear and driven gear engage, and the conventional duck decoy is caused to return to its starting position when the smooth portion of the periphery is in apposition to said driven gear and the bungee contracts, thereby simulating one duck chasing a second duck.

12. The decoy system according to claim 11, further comprising an on/off switch disposed on the hollow body for controlling the rotating means.

13. The decoy system according to claim 11, wherein the rotating means is a D.C. motor.

14. The decoy system according to claim 13, further comprising a rechargeable battery connected to the D.C. motor.

15. The decoy system according to claim 14, further comprising a recharger connection disposed on the bottom half of the body and connected to the rechargeable battery.

16. The decoy system according to claim 11, further comprising a hinge attached to the body for joining the top half of the body to the bottom half of the body.

17. The decoy system according to claim 11, further comprising a lock disposed on the body for securing the top half of the body to the bottom half of the body.

18. The decoy system according to claim 11, further comprising waterproof sealing means disposed between the top and bottom halves of the body.

* * * * *